Figure 1:
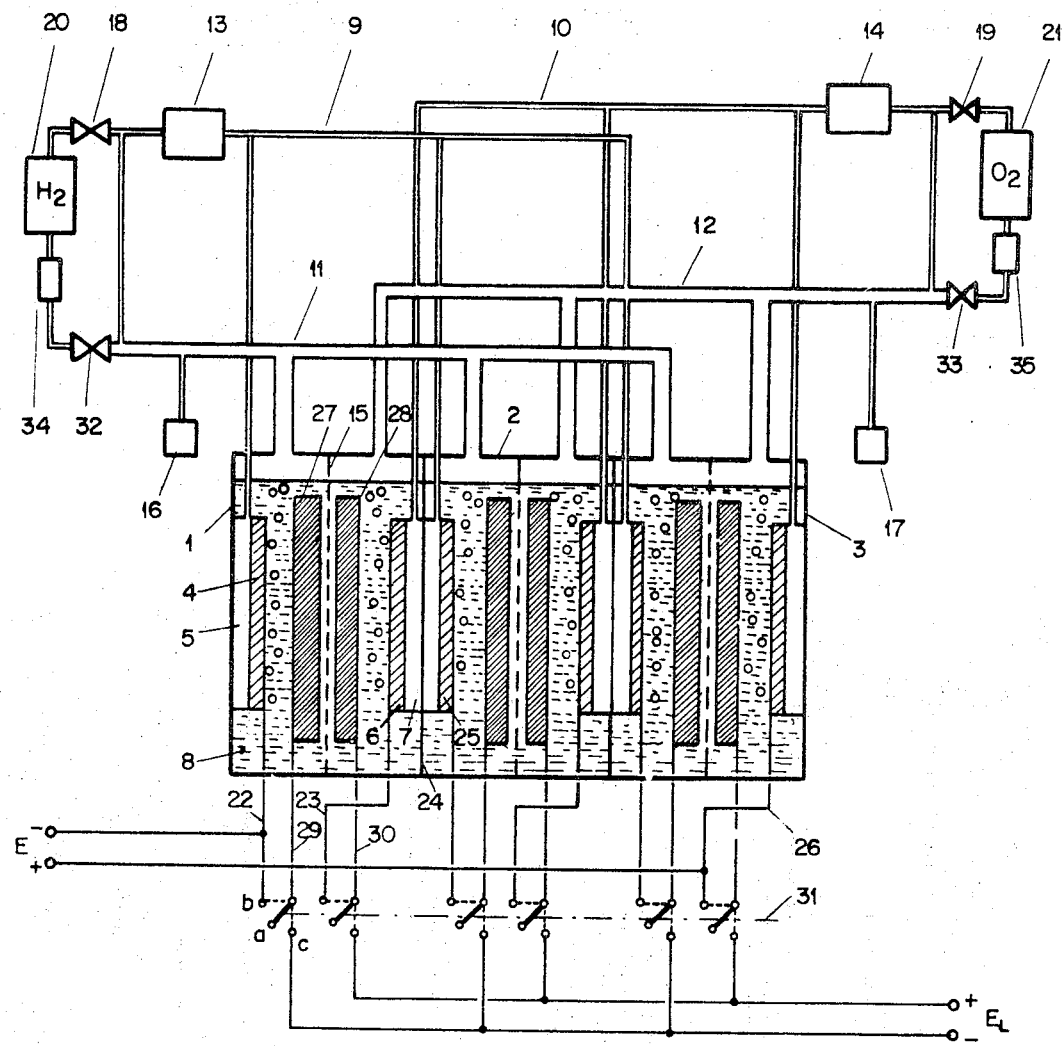

Aug. 29, 1967 H. G. PLUST ETAL 3,338,746
LOW-TEMPERATURE FUEL CELL IN COMBINATION WITH
A POWER ACCUMULATOR
Filed April 24, 1964 2 Sheets-Sheet 1

United States Patent Office 3,338,746
Patented Aug. 29, 1967

3,338,746
LOW-TEMPERATURE FUEL CELL IN COMBINATION WITH A POWER ACCUMULATOR
Heinz Günther Plust, Spreitenbach, Aargau, and Carl Georg Telschow, Zurich, Switzerland, assignors to Aktiengesellschaft Brown, Boveri & Cie, Baden, Switzerland, a joint-stock company
Filed Apr. 24, 1964, Ser. No. 362,346
Claims priority, application Switzerland, May 30, 1963, 6,758/63
7 Claims. (Cl. 136—3)

Arrangements for generating electric power must meet the requirement that the power which is delivered to the consumer can vary in magnitude. In order to avoid the necessity of providing a power generator capable of meeting the maximum output demand power accumulators must be provided which are able to deliver power during periods of high power demand while storing energy during periods of lower power requirements.

In generating electric power from chemical energy by means of fuel elements it is known to employ the matter stored in the gas diffusion electrodes as power accumulator during periods of increased power demand. For example, in case of fuel elements which convert hydrogen and oxygen electro-chemically hydrogen is stored in atomic form in the voids of Raney-nickel electrodes. However, such storage is not yet possible for oxygen electrodes because there is no electrode of this type known with a storage capacity for oxygen comparable with a hydrogen electrode. Furthermore, the energy stored in gas diffusion electrodes is not available immediately because the small diameters of the electrode voids have a retarding effect on the process of delivery. An increase in the dimensions of the voids is not feasible because it is also a function of the electrode to form a macroscopic dividing wall between the gas chamber and the electrolyte. For these reasons it is necessary to provide in addition to the fuel element which generates energy an accumulator which stores the energy because the size of its electrode voids is not subject to the requirements for separating the gas and the liquid.

Also known in an alkaline accumulator for the storage of electric energy where a Raney-nickel electrode serves as the negative electrode and a nickel oxide or silver oxide electrode serves as the positive electrode.

It is the object of the present invention to create a fuel element in combination with a power accumulator which can deliver additional power periodically, is efficient electrically while permitting the charging of the accumulator in an easy manner and without possibility of any self-discharge.

The invention relates to a low-temperature fuel element which is provided, for the purpose of electro-chemical conversion of hydrogen and oxygen, with gas diffusion electrodes immersed in an alkaline electrolyte where the gases to be converted flow partially through the electrodes and are returned cyclically to the electrodes by means of a circulating apparatus. It is the specific characteristic of the fuel element that one Raney-nickel electrode and one nickel oxide or silver oxide electrode—known per se as accumulator electrodes—are arranged within the same electrolyte in such manner that the surface of the Raney-nickel electrode is flushed by the through-flow of hydrogen, and the nickel oxide or silver oxide electrode by the through-flow of oxygen.

Figure 4:
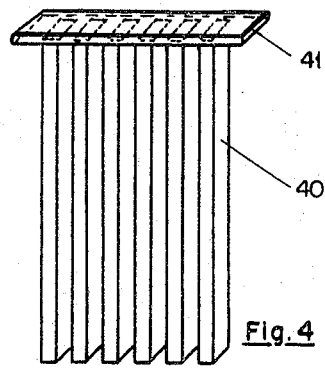
Figure 5:
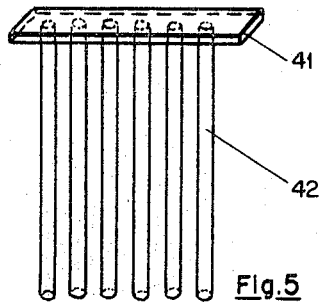
Figure 6:
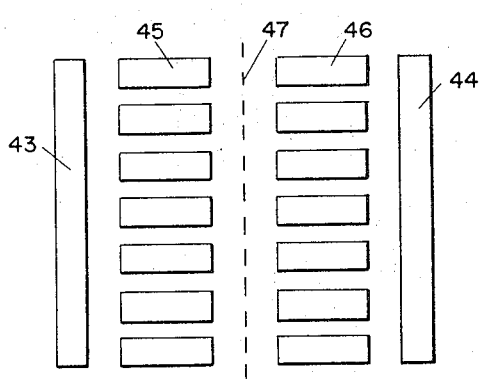
Figure 7:
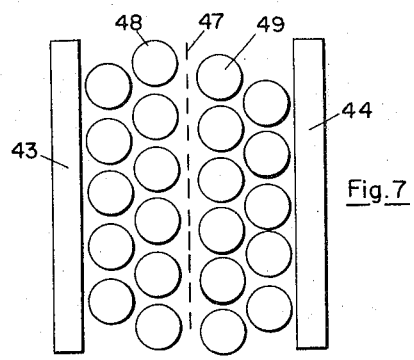

The invention is explained in detail on the basis of the accompanying drawings:

FIGURE 1 shows in diagram form a species of a fuel element in combination with a power accumulator together with the gas supply components and current conductors, FIGURES 2 to 5 show various advantageous types of accumulator electrodes, FIGURES 6 and 7 show examples for the layout of the accumulator electrodes.

FIGURE 1 illustrates a fuel element in combination with a power accumulator which is composed of three, identically designed, fuel cells, 1, 2 and 3. In each cell there are present—in known manner—one porous hydrogen electrode 4 with its gas chamber 5 and one porous oxygen electrode 6 with its gas chamber 7. The electrodes are immersed in the alkaline electrolyte 8. The electrode 4, as well as the corresponding electrodes in cells 2 and 3, are supplied with hydrogen through gas lines 9. The electrode 6, and the corresponding electrodes in cells 2 and 3, are supplied in like manner with oxygen through gas lines 10. The gas pressure within the gas supply lines 9 and 10 is selected in known manner in such a way that not the total gas volume is converted within the voids of the electrodes but that a part of the gas, without being utilized, will pass through the electrodes, flow through the electrolyte 8 to be conveyed above the electrolyte through lines 11 and 12 respectively. By means of the circulation apparatus 13, or 14 respectively, the gas then is returned cyclically to the electrodes 4, or 6 respectively. The circulation equipment 13 and 14 is provided with means periodically to generate pressure shocks with the advantageous result that the voids of the electrodes are freed of any harmful reaction products. The circulation apparatus 13 and 14 can consist, for example, of a piston or diaphragm pump.

Each cell is divided by a wall 15 which is provided to keep the gases separated. At least that portion of the wall which is immersed in the electrolyte 8 is made in porous form so that the conductive electrolyte will close the current path between the two electrodes 4 and 6. The dividing wall can consist of a standard diaphragm made of a synthetic material such as polyethylene.

When the pressure within gas lines 11 or 12 reaches a predetermined minimum operating value as a result of the electrochemical gas conversion, the pressure sensing elements 16 or 17 respectively will respond and release the electro-magnetic valves 18 or 19 respectively of gas supply tanks 20 or 21 which are under higher pressure. As soon as the gas supply system has restored the maximum operating pressure, the pressure-sensing elements 16 or 17, will bring about the closing of valves 18, or 19, respectively.

Numerals 22 and 23 denote the electrical connecting lines of the hydrogen electrode 4 and the oxygen electrode 6. In the embodiment illustrated the fuel cells 1, 2 and 3 are connected electrically in series. For this reason the oxygen electrode 6 of cell 1 and the hydrogen electrode 25 of the the adjacent cell 2 are placed side by side at their common dividing wall 24 and internally connected with each other electrically. In the same manner one oxygen and one hydrogen electrode are placed next to each other and connected at the wall which divides cells 2 and 3. Terminals E are provided for the consumer. The negative terminal E is connected through line 22 with the first hydrogen electrode (cell 1) and the positive terminal E through line 26 with the last oxygen electrode (cell 3).

Suitable hydrogen electrodes are porous gas diffusion nickel base electrodes, carbon electrodes, or electrodes made of synthetic material and impregnated with a precious metal such as platinum. Particularly advantageous are porous Raney-nickel electrodes. Porous nickel electrodes impregnated with palladium are especially suitable as oxygen electrodes. The most suitable electrolyte is a 6N-potash lye.

The invention provides for the immersion in the alkaline electrolyte 8 of each fuel cell of one Raney-nickel electrode 27 and one nickel oxide or silver oxide electrode 28 to serve as accumulator electrodes. These accumulator electrodes which are known per se are arranged in each electrolyte area, formed by diaphragm walls 15, in such manner that the surface of the Raney-nickel electrode 27 is flushed by the hydrogen flowing through the electrode 4 and the surface of the nickel oxide or silver oxide electrode 28 is flushed by the oxygen flowing through the electrode 6. These accumulator electrodes, in FIGURE 1 shown in the form of plates, can be supported for example from the upper cell wall.

Each accumulator electrode is provided with a connecting wire. The connecting wire for the negative Raney-nickel electrode 27 is denoted by numeral 29 and the positive wire of the nickel oxide or silver oxide electrode 28 by numeral 30. All wires of the accumulator electrodes terminate at switches 31 and all switches are operated by a central control. The accumulator electrodes are placed into appropriate circuits by means of these switches to meet the operating conditions described below.

During normal operations (switch position $a$), that is in case of normal power demands, the fuel element delivers electric energy at the hydrogen and the oxygen electrodes. The accumulator electrodes are fully charged, their temperature being identical with the temperature of the fuel element.

If there exists a demand for more power the switches are placed in position $b$. The Raney-nickel electrode 27 is now connected electrically with the hydrogen electrode 4 in each cell (1, 2 and 3), and likewise the nickel oxide or silver oxide electrode 28 with the oxygen electrode 6 and simultaneously with terminals E so that the full capacity of the accumulator electrode can be utilized.

In switch position $c$ all accumulator electrodes are connected in parallel with terminals $E_L$. These terminals lead to an external source of power (not shown) which serves to recharge the accumulator electrodes. Charging of the accumulators can be accomplished during the operation of the fuel element because the accumulator electrodes are separated electrically from the fuel element electrodes at switch position $c$.

The first advantage of the combination of a fuel element with a power accumulator of the present invention is its compact design. Obviously, the components required for the fuel element and the accumulator, namely electrodes, electrolyte chambers, diaphragms, wiring and switches, will have more weight and take up more space if the fuel element and the accumulator are separated spatially.

When compared with a standard accumulator which is separated from the fuel element an accumulator arranged within a fuel element in accordance with the present invention offers the further advantage that at the increased operating temperature, for example 80° C., caused by the fuel element, a more rapid discharge of the accumulator becomes feasible. Thus, in case of excess load the required power will be available within a fraction of a second, a feature which is particularly important for the acceleration of a drive mechanism.

Since the accumulator electrodes are subjected continuously to a gas flow, either hydrogen or oxygen, any self-discharge of the accumulator cannot occur during normal operation (delivery of power by the fuel element only) because the flushing by these gases represents chemically a state of suspension. This is still another and significant advantage over standard accumulators which have a tendency of self-discharge, especially at higher temperature which is desirable as such because it facilitates rapid delivery of power.

The flushing of the accumulator electrodes with hydrogen or oxygen respectively also has the advantage that the electrolyte is stirred by the circulation of the gases. In this manner the load capacity of the accumulator electrodes is increased because the drop in concentration which exists near the electrodes and which is a limiting power factor is reduced by convection.

The flushing of the accumulator electrodes with hydrogen or oxygen respectively will cause also an electrochemical conversion of the gases at the active surfaces of the accumulator electrodes, especially if for purposes of activation the nickel oxide or silver oxide electrode is impregnated with palladium. Consequently, it becomes possible in an advantageous manner to satisfy partially a greater power requirement without recourse to the accumulator capacity by the electro-chemical conversion of the gases at the accumulator electrodes, or in case of a very high output requirement it will be possible to permit a continual overload of approximately 50%.

Another advantage of the fuel element in combination with a power accumulator is the efficiency when charging the accumulator in comparison with the efficiency of known alkaline accumulators. The intensive generation of gas which occurs during the charging of the accumulator and especially during the final stage of the charging operation will cause a substantial loss, reducing the current yield to approximately 70%. In case of the accumulator of the present invention the developing gases are collected without special effort due to the circulation cycles of the fuel element in the same manner as the electro-chemically unused gases through lines 11 and 12 (FIGURE 1) and reused in the fuel element electrodes 4 and 6. Finally, there is no need for precautionary measures which normally are required for larger-sized accumulators because of the generation of gases.

If there is an excess of gas generation, for example if during the charging of the accumulator electrodes no current is drawn from the fuel element, it will be advantageous to store the gases under pressure. For this purpose additional valves 32, and 33 respectively are connected to gas lines 11 and 12 which are connected to the compressors 34 and 35 which discharge into gas supply tanks 20 and 21. Whenever the pressure within gas line 11 or 12 exceeds the upper limit of operation the pressure-sensing element 16 or 17 respectively will cause the valve 32 or 33 to open and the compressor 34 or 35 to begin to operate, thereby storing the excess of gas in the gas storage tanks. It follows that by means of the accumulator electrodes an electrolysis can be carried out independently of the fuel element which is advantageous for the recuperation of the energy, for example during braking operation when employed in connection with a drive mechanism.

It is obvious from the above given description that in accordance with spatial requirements and the potential desired at the terminals any number of cells can be arranged and connected electrically in variance from the manner illustrated in FIGURE 1.

FIGURES 2 to 7 depict various advantageous designs and arrangements of the accumulator electrodes in the electrolyte chamber.

Figure 2:
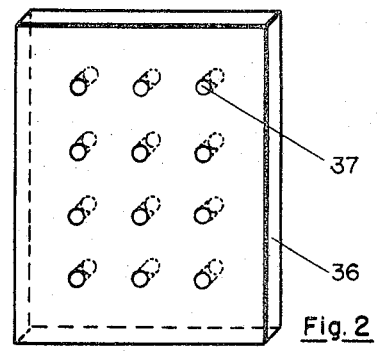

FIGURE 2 shows an accumulator electrode 36 in sheet form, for example a porous nickel oxide electrode, which is provided with additional apertures 37. These apertures facilitate the movement of electrolyte and thereby effect advantageously the load capacity of the electrodes of the fuel element. The most suitable dimension of the apertures is approximately 5% of the geometrical area of the fuel electrode.

Figure 3:
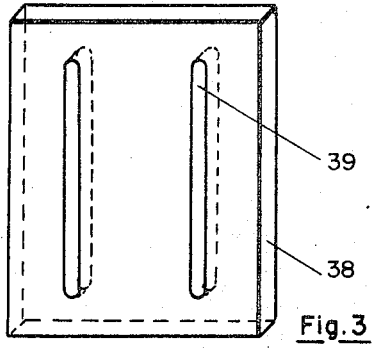

Another species is shown in FIGURE 3 where slots 39 are provided in the accumulator electrode 38.

It will be advantageous to make the accumulator electrodes larger in size than the corresponding fuel element electrodes because in the absence of any limitation on the dimensions of the voids with respect to separation of gas and electrolyte the available electrolyte area can be utilized to a very great extent by the accumulator electrodes.

FIGURE 4 depicts an accumulator electrode which is composed of several rectangular elements 40. FIGURE 5 shows a similar arrangement but with cylindrical rods 42. Numeral 41 denotes in both FIGURES 4 and 5 the support of these electrodes. The distance between rods is approximately .5 to 1 mm. The dimensions are, for example 1 x 5 mm. in case of rectangular rods and 4 mm. diameter in case of cylindrical rods at a length of 100 mm. It is further possible to arrange such elements in several rows at identical distances from each other. The vertical arrangement of these rods has the substantial advantage that the formation of interfering gas pockets can be avoided. Furthermore, this design makes it possible to keep the intervals between the fuel element electrode and the accumulator electrode extremely small.

FIGURE 6 shows the arrangement of the electrodes within the electrolyte in a horizontal section. Numeral 43 denotes the plate-shaped hydrogen electrode and numeral 44 the oxygen electrode. In close proximity to these electrodes there are arranged the accumulator electrodes i.e. the Raney-nickel electrodes 45 and the nickel oxide or silver oxide electrodes 46 in the form of rectangular rods. The two electrolyte areas are divided by the diaphragm 47.

FIGURE 7 depicts a similar arrangement with cylindrical accumulator electrodes 48 and 49 which make feasible a particularly compact construction.

We claim:
1. A low temperature fuel cell in combination with a power accumulator comprising hydrogen and oxygen diffusion electrodes immersed in the same alkaline electrolyte, means for circulating the gases that pass through said electrodes cyclically back to the respective electrodes, a Raney-nickel accumulator electrode positioned in the same electrolyte adjacent to said hydrogen electrode and a nickel oxide or silver oxide accumulator electrode positioned in the same electrolyte adjacent to said oxygen electrode so that the surfaces of said accumulator electrodes are flushed by the gases that flow through said hydrogen and oxygen electrodes.

2. Fuel cell according to claim 1 in which the outer surface of each accumulator electrode is larger than the outer surface of the adjacent gas diffusion electrodes.

3. Fuel cell according to claim 1 in which the accumulator electrodes are provided with apertures.

4. Fuel cell according to claim 1 in which each accumulator electrode consists of a plurality of elongated elements.

5. Fuel cell according to claim 1 in which for delivery of increased power the Raney-nickel electrode is connected electrically with the hydrogen electrode and the nickel oxide or silver oxide electrode is connected electrically with the oxygen electrode.

6. Fuel cell according to claim 1 in which for the purpose of being charged the accumulator electrodes are connected with an external source of power.

7. Fuel cell according to claim 6 comprising means for storing the hydrogen and the oxygen generated during the charging operation under pressure.

References Cited
UNITED STATES PATENTS

| | | | |
|---|---|---|---|
| 3,080,440 | 3/1963 | Ruetschi et al. | 136—3 |
| 3,202,544 | 8/1965 | Vielstich | 136—86 X |

WINSTON A. DOUGLAS, *Primary Examiner.*

ALLEN B. CURTIS, *Examiner.*